(12) United States Patent
Zapalac, Jr. et al.

(10) Patent No.: US 7,649,365 B1
(45) Date of Patent: Jan. 19, 2010

(54) INLINE INSPECTION OF PHOTOVOLTAICS FOR ELECTRICAL DEFECTS

(75) Inventors: George H. Zapalac, Jr., Santa Cruz, CA (US); Kirk J. Bertsche, San Jose, CA (US); David L. Brown, Sunnyvale, CA (US); J. Kirkwood H. Rough, San Jose, CA (US); David A. Soltz, San Jose, CA (US); Yehiel Gotkis, Fremont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 279 days.

(21) Appl. No.: 11/690,809

(22) Filed: Mar. 24, 2007

(51) Int. Cl.
*G01R 31/302* (2006.01)
*G01R 31/08* (2006.01)

(52) U.S. Cl. .................. 324/752; 324/522
(58) Field of Classification Search ............... 324/752, 324/522

See application file for complete search history.

(56) References Cited

U.S. PATENT DOCUMENTS 4,967,152 A * 10/1990 Patterson ................... 324/752
6,917,209 B2 * 7/2005 Ellison ...................... 324/750

* cited by examiner

*Primary Examiner*—Amy He
(74) *Attorney, Agent, or Firm*—Luedeka, Neely & Graham, P.C.

(57) ABSTRACT

A method of inline inspection of photovoltaic material for electrical anomalies. A first electrical connection is formed to a first surface of the photovoltaic material, and a second electrical connection is formed to an opposing second surface of the photovoltaic material. A localized current is induced in the photovoltaic material and properties of the localized current in the photovoltaic material are sensed using the first and second electrical connections. The properties of the sensed localized current are analyzed to detect the electrical anomalies in the photovoltaic material.

1 Claim, 3 Drawing Sheets

US 7,649,365 B1

INLINE INSPECTION OF PHOTOVOLTAICS FOR ELECTRICAL DEFECTS

FIELD

This invention relates to the field of photovoltaics. More particularly, this invention relates to the inline inspection of photovoltaic films.

BACKGROUND

Photovoltaics can be made from a variety of different materials and by way of a variety of different processes. One of the more promising fabrication methods—from a cost standpoint at least—is to form continuous webs of photovoltaic material that are sequentially processed as the web moves along a production line. Thus, various layers of the photovoltaic devices are sequentially formed, one on top of another, as the web of built-up material progresses down the moving production line. Another fabrication method is to deposit the photovoltaic film on plate glass, which is the preferred method to fabricate CdTe solar cells.

In the past, electrical defects in the photovoltaic film have been studied by removing a sample from the production material and inspecting the sample offline. Removing a sample often introduces serious defects near the edges of the remaining photovoltaic material where the sample was removed.

Further, examining the sample offline means that the information cannot be readily used in an automatic feedback loop for control of the film deposition processes. Further, such offline testing is time consuming, which results in a potential greater loss of material, in the event of a process excursion.

What is needed, therefore, is a system that overcomes problems such as those generally described above, at least in part.

SUMMARY

The above and other needs are met by inline inspection of the photovoltaic film for electrical anomalies without removing samples. A first electrical connection is formed to a first surface of the photovoltaic material, and a second electrical connection is formed to an opposing second surface of the photovoltaic material. A localized current is induced in the photovoltaic material, and properties of the localized current in the photovoltaic material are sensed using the first and second electrical connections. The properties of the sensed localized current are analyzed to detect the electrical anomalies in the photovoltaic material.

In various embodiments according to this aspect of the invention, at least one of the first electrical connection and the second electrical connection is formed using a physical contact to the photovoltaic material. In some embodiments, at least one of the first electrical connection and the second electrical connection is formed using a non-physical contact to the photovoltaic material. In yet other embodiments, the first electrical connection is formed using at least one of a laser and an electron beam.

According to another aspect of the invention there is described a method of inspection by applying an ultraviolet probe laser to a location of the photovoltaic material, where the probe laser is applied at a probe energy sufficient to emit photoelectrons from a conduction band of the photovoltaic material into a vacuum environment, but the probe energy is insufficient to substantially excite electrons from a valence band of the photovoltaic material into a vacuum environment, and simultaneously applying a visible pump laser to the same location of the photovoltaic material, where the pump laser is applied at a pump energy sufficient to excite photoelectrons from the valence band of the photovoltaic material to the conduction band, but the pump energy is insufficient to substantially emit photoelectrons from the conduction band of the photovoltaic material into the vacuum environment, sensing the photoelectrons that are excited into the vacuum environment to measure a current, and interpreting fluctuations in the current as electrical anomalies as a function of position on the photovoltaic surface.

In various embodiments according to this aspect of the invention, the photovoltaic material does not include a contact film at the location of the application of the probe laser. In some embodiments, the probe laser is applied to a first side of the photovoltaic material and the pump laser is applied to a second side of the photovoltaic material.

In other embodiments, both the probe laser and the pump laser are applied to a first side of the photovoltaic material through a transparent port into the vacuum environment, where an interior surface of the transparent port is coated with a transparent conductive material that is disposed in proximity to the photovoltaic material sufficient to receive and sense the photoelectrons emitted from the photovoltaic material, and the transparent conductive material is disposed in sections on the transparent port, where the sections are electrically isolated one from another, thereby enabling separate measurement of the emitted photoelectrons based on a position of the photovoltaic material from which the photoelectrons are emitted, and the probe laser further comprises multiple probe lasers, one each of the multiple probe lasers dedicated to simultaneous irradiation of the photovoltaic material through an associated section of the transparent conductive material.

According to yet another aspect of the invention there is described a method of inspecting continuously moving photovoltaic material for electrical anomalies without stopping the movement or removing samples, by forming electrical connections to the photovoltaic material, and inducing either via electron beam or light beam a first localized current in the photovoltaic material with a first stripe source, sensing the first localized current at a first time, and likewise inducing a second localized current either via electron or light beam on the photovoltaic material with a second stripe source, sensing the second localized current at a second time, where the first stripe source is positioned downstream along the moving photovoltaic material from the second stripe source, and the first stripe source and the second stripe source are oriented at a non-zero angle relative to one another, analyzing properties of the first and second localized currents to detect the electrical anomalies in the photovoltaic material, and determining positions of the electrical anomalies in the photovoltaic material based at least in part on a time difference between the first time and the second time and a measure of the non zero angle between the first and second stripe sources.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
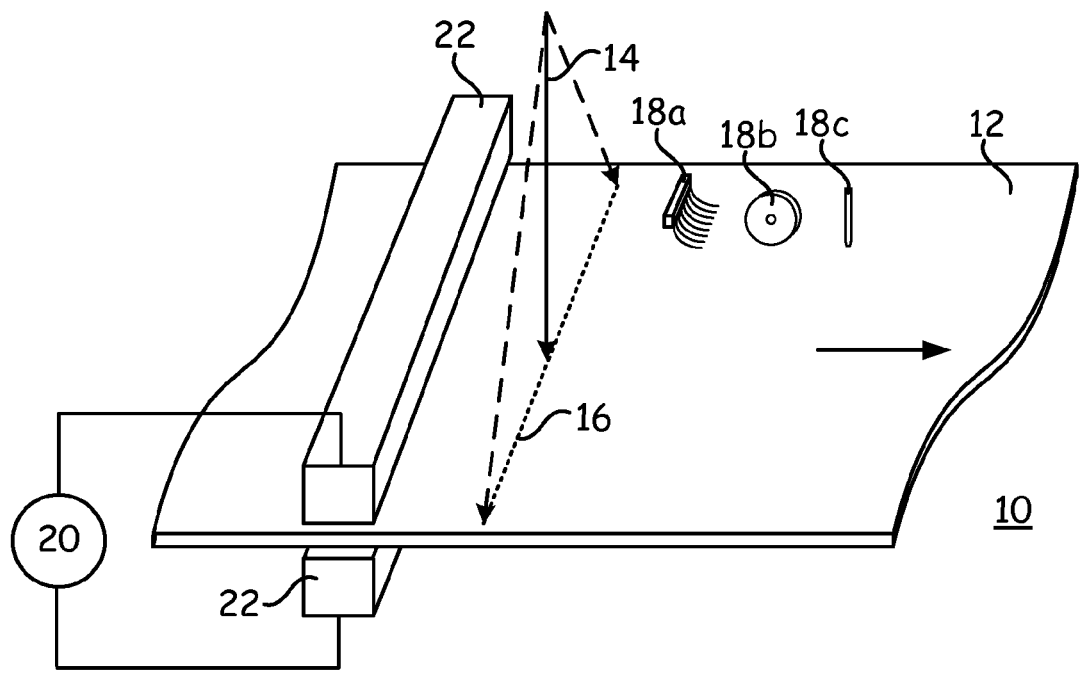
FIG. 1 is a first embodiment for a non-physical method for making electrical contact with a film, according to the present invention.

According to the several embodiments of the present invention, there is described a system 10 to perform an inline inspection for electrical defects of various kinds in a photovoltaic thin film 12, as depicted in FIG. 1. The photovoltaic 12 could be one or more of a variety of different kinds, such as Cu(In,Ga)Se, Cu(In,Ga)S, or any member of this family of chalcopyrites, or CdS, CdSe, CdTe, or any member of this family of materials, or amorphous silicon.

In one embodiment, the inspection is performed using a beam 14, which is either an optical beam (optical beam induced current) or, if the material 12 is under vacuum, and electron beam (electron beam induced current). Regardless of the type of beam 14 used, the beam 14 induces a current in the photovoltaic 12.

If the material 12 is moving, as in the case of film deposition on a moving web of material during manufacture, the beam 14 is preferably rastered back and forth across the material 12, normal to the direction of movement of the material 12, to produce an x, y scan 16 of the surface of the material 12, where x is in the direction of the motion of the material 12. This movement of the beam 14 can be accomplished by moving either the beam 14 source, or directing the beam 14 itself back and forth, such as by a moving mirror for optical beam induced current or by a changing magnetic or electrical field for electron beam induced current. Alternately, the photovoltaic material 12 could be moved relative to the beam 14.

Alternately, the beam 14 remains stationary relative to the width of the moving material 12, so as to sample a single strip along the length of the material 12, and the data collected is used for feedback to the film deposition processes. However, this embodiment does not allow for repair of the material 12 by laser ablation, as described hereafter. In yet another embodiment, multiple beams 14 could be used to sample multiple strips along the length of the material 12.

The top conductor illuminated by the beam 14 is, in one embodiment, the transparent conducting oxide that is typically formed on a photovoltaic device, such as zinc oxide or indium tin oxide. The opposite side of the material 12 would then be the conducting substrate, such as stainless steel. The variation in the current produced by the photovoltaic 12 as induced by the beam 14 is used to detect electrical non uniformities in the film 12 as a function of position.

Electrical contacts 18 or 22 are preferably made between an ammeter 20 or other current sensing instrumentation and both sides of the photovoltaic 12 to detect the current that is induced by the beam 14. The electrical contacts 18 and 22 can be made using either a method that does not physically contact the material 12, or one that does physically contact the material 12, or a blend of both methods.

For example, one method of making physical contact with a moving web of material 12 is by using conducting brushes 18a that drag on the surfaces of the material 12 as the material 12 moves relative to the brushes 18a. Another method is to use a conductive roller 18b. Yet another method is to have a conductive physical probe 18c that moves with the material 12 for a period of time, is then raised, repositioned, and lowered again to make contact in a different position of the material 12.

When electron beam induced current is used, the electron beam 14 itself may be used as a non-contact upper electrical connection, forming either a positive or negative contact depending on the landing energy employed. If desired, two or more electron beams could be used, one for probing the material, and the second for making positive or negative electrical contact. In this embodiment, one or more of the physical contact methods 18 could be used for the electrical connection to the bottom of the material 12, or some non-contact method could be used.

An alternate method for making electrical contact without physically touching the film 12 is to use a contained plasma or corona 22. In this case, the film 12 passes by a relatively thin plasma or corona region, which is preferably isolated from the rest of the environment, whether that be a vacuum chamber or open atmosphere. This region can be confined such as with a rectangular box 22 running across the length of the material 12, containing the necessary field for plasma or corona generation, and having a pressure that is different from the rest of the inspection device 10.

Figure 2:
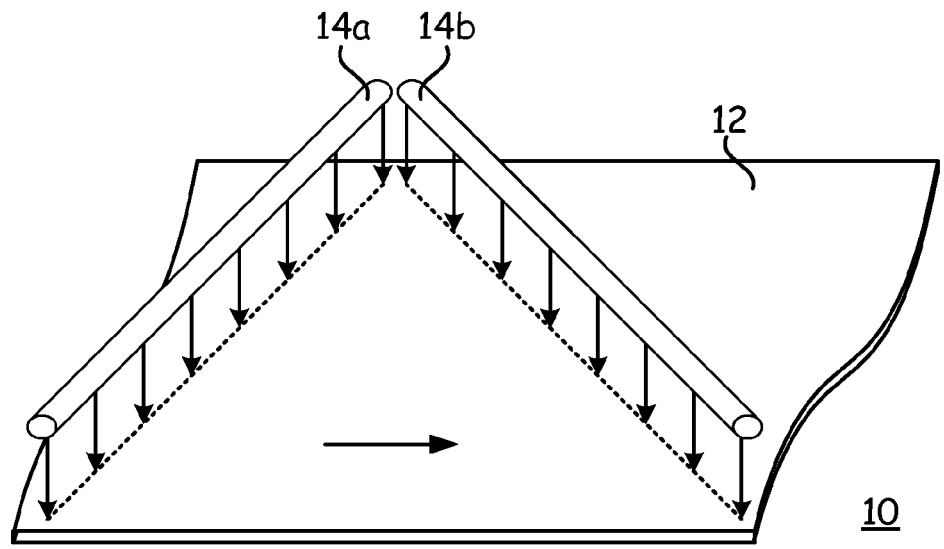
FIG. 2 is a first embodiment for illuminating a film, according to the present invention.

Optical beam induced current can be performed on a moving film of material with one or two light beams 14a and 14b, as depicted in FIG. 2. In one embodiment, these beams 14a and 14b run across the material 12 in opposite diagonal orientations, allowing for localization of any defect. The beams 14a and 14b are modulated in one embodiment, to gain additional information from the measurement. FIG. 2 depicts an embodiment where light beams 14a and 14b simultaneously illuminate a large swath of the material 12. Defects are imaged along the moving axis of the material 12, and localized on the material 12 due to the different orientations of the two beams 14a and 14b. This method tends to be faster than scanning each beam 14a and 14b as a point across the width of the material 12. Scattered light from beams 14a and 14b could also be used to detect non-electrical defects during any point of the film deposition process, including defects on the bare substrate.

The time difference between anomalies as produced by the two beams 14a and 14b as the material 12 proceeds along its path of motion indicates where across the width of the material 12 the defect resides. For example, a defect in the material 12 that is located at a point in the material 12 where the beams 14a and 14b are relatively close to one another would produce electrical events that are relatively closer together in time, while a defect in the material 12 that is located at a point in the material 12 where the beams 14a and 14b are relatively far apart would produce electrical events that are relatively farther apart in time. With knowledge of the angle between the beams 14a and 14b and the speed of the material 12, the location of the anomaly in the material 12 can be determined.

Electrical isolation of the inspected region can be provided by scribing away a line of the transparent conducting oxide contact to effectively segment the material 12 into electrically isolated regions. Alternately, it may be possible to rely on the sheet resistance of the transparent conducting oxide. The sheet resistance is typically about ten ohms per square, but in one embodiment, a very thin layer with a much higher sheet resistance is formed, as in the deposition of a zinc oxide film on Cu(In,Ga)Se material, then the inspection is performed, and finally the remainder of the transparent conducting oxide is formed, as in the deposition of a final aluminum doped film of zinc oxide.

Finding electrical defects while keeping up with the speed of a moving web of material 12 is best performed using relatively high data acquisition rates. A high speed time delay and integration acquisition system is used in one embodiment to acquire the induced current data. Analysis of the data may require a measurement of the current-voltage curve at each scan point. Weak diode or shunting defects are localized in one embodiment to within an area of about two millimeters in diameter and then electrically isolated from the remainder of the surface by laser ablation. In one embodiment the beam 14 sources preferably illuminate the web 12 between two parallel strip conducting brushes 18, not depicted in FIG. 2.

Some embodiments of the invention are especially beneficial for finding Ohmic shunts in the material 12, which drain photocurrent from the load under any voltage bias, and also for finding weak diodes in the material 12, which drain photocurrent from the load while under forward bias. Locating the positions of the worst shunts (the word "shunts" generally includes the concept of "weak diodes" as used hereafter) during the fabrication process allows them to be electrically isolated, which increases the efficiency of the photovoltaic material 12. The electrical isolation of the shunts can be accomplished by laser ablation, for example, to remove the transparent conducting oxide layer or back contact material in a ring enclosing the shunt or, for the case of shunts located close to the edge of the photovoltaic material, by enclosing the shunt using both the edge of the photovoltaic material and an ablated region that intersects the edge of the material on either side of the shunt. The shunt position, and other useful information such as shunt resistance, as well as information on position and energy level of any recombination centers, and local characterization of areas of reduced carrier mobility can also be used to provide feedback for material deposition and general process control during fabrication of the photovoltaic 12.

Figure 3:
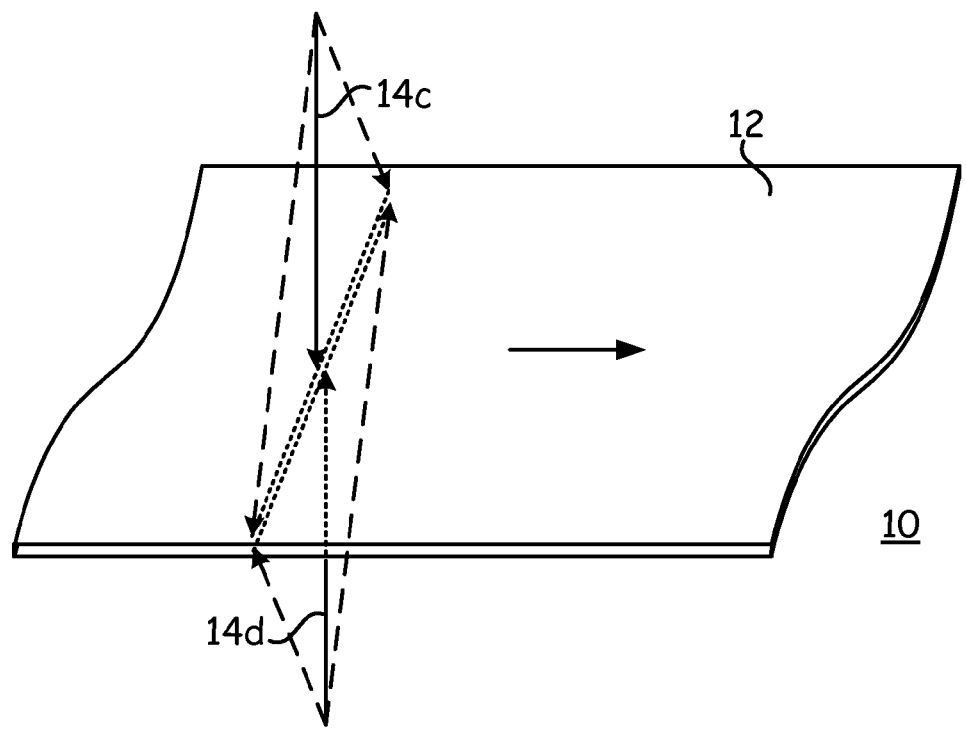
FIG. 3 is a second embodiment for illuminating a film, according to the present invention.

An optical beam 14 induced current scan of the film 12 that is performed after the final transparent conductive oxide contact is applied to the film 12 is generally sensitive to substantially all shunts beneath the conducting contact, not only the shunt closest to the light beam 14. This greatly reduces the signal to noise level of the measurement. However, various embodiments of the present invention detect localized shunting defects in thin films 12 by measuring the photoelectric yield from the surface of the photovoltaic 12 before application of the final contact layer by using an ultraviolet laser 14*c*, as depicted in FIG. 3. This ultraviolet laser is called the probe laser 14*c*. The scan of the photovoltaic material 12 by the probe laser 14*c* may be assisted by simultaneous illumination of the probed region with a visible laser, called the pump laser 14*d*.

The ultraviolet laser 14*c* in one embodiment is held at a high enough energy to excite electrons from the conduction band minimum to the vacuum, but at an energy that is too low to excite electrons from the top of the valence band maximum to the vacuum. The pump laser 14*d* in this embodiment is held at a high enough energy to excite electrons from the valence band to the conduction band, but at an energy that is too low to excite electrons from the conduction band to the vacuum.

In one embodiment, the probe laser 14*c* is a 266 nanometer, 4.66 electron Volt, frequency quadrupled YAG laser, and the pump laser 14*d* is a 532 nanometer, 2.33 electron Volt, frequency doubled YAG laser. The intensity of the pump laser 14*d* is much greater than the intensity of the probe laser 14*c* in this embodiment, so that most of the photoelectrons are excited to the conduction band by the pump laser 14*d* rather than by the probe laser 14*c*.

This method could be applied, by way of example, to a thin (four micron) film of CdTe deposited on glass—a typical superstrate configuration CdTe solar cell—just before deposition of the final conducting film as a back contact. The ultraviolet probe laser 14*c* scans the CdTe surface 12 in a dark room. It incites the ejection of photoelectrons from the top five to ten nanometers of the CdTe material 12. Because the energy of the probe laser 14*c* is not high enough to excite electrons from the valence band at 5.78 electron Volts, only the electrons that are initially excited by the probe 14*c* from the valence band to states in the conduction band at 4.28 electron Volts are ejected as photoelectrons. For sufficiently low intensities of the probe laser 14*c*, the count rate for these photoelectrons is relatively small.

Figure 5:
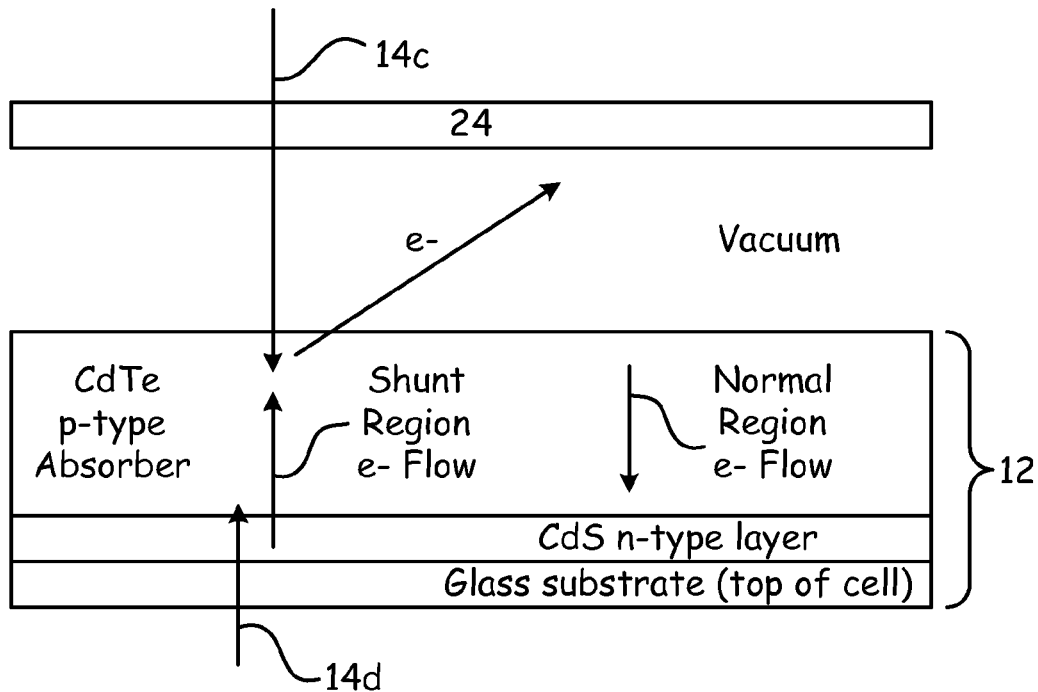
FIG. 5 depicts an embodiment for the flow of electrons through a first type of photovoltaic material in both the presence of a shunt and in normal operation of the photovoltaic material, when a probe and pump are applied to the material.

A large population of electrons may be excited to the CdTe conduction band by intense illumination of the film 12 from the opposite side (through the glass substrate) by the visible light pump laser 14*d*. These electrons are excited throughout the depth of the film 12, but relatively few photons reach the top few nanometers of the CdTe 12 surface on the opposite side from the glass substrate because of the high absorption of visible light by CdTe. Electrons in the conduction band reach the ultraviolet probe 14*c* primarily by conduction across the CdTe film 12. In general, the action of the solar cell 12 in the presence of visible light (such as from the pump laser 14*d*) conducts the electrons away from the ultraviolet probe 14*c* and towards the glass (on the bottom of the material 12). However, in the presence of a shunt, the electrons conduct in the opposite direction, towards the ultraviolet probe 14*c*, where some are ejected as photoelectrons, and thereby serve to complete a circuit through an ammeter (not depicted in FIG. 3) that is connected to the detector. Hence, an elevated ammeter reading during the scan indicates the presence of a shunt in the photovoltaic film 12. FIG. 5 depicts both the flow of electrons in the presence of a shunt, and in normal operation of the photovoltaic 12.

Because the back contact of the film 12 has not yet been deposited on the CdTe surface, the shunts are generally electrically isolated from one another by the high resistivity of the CdTe film 12, so that the probe 14*c* is only sensitive to electrical defects directly beneath it. The visible light 14*d*, besides pumping electrons to the conduction band and turning on the open circuit voltage of the solar cell 12, also serves to induce a forward bias, and thereby turns on any weak diodes beneath the probe laser 14*c* by means of the open circuit voltage developed across the film 12 in the vicinity of the probe 14*c* during illumination.

Figure 4:
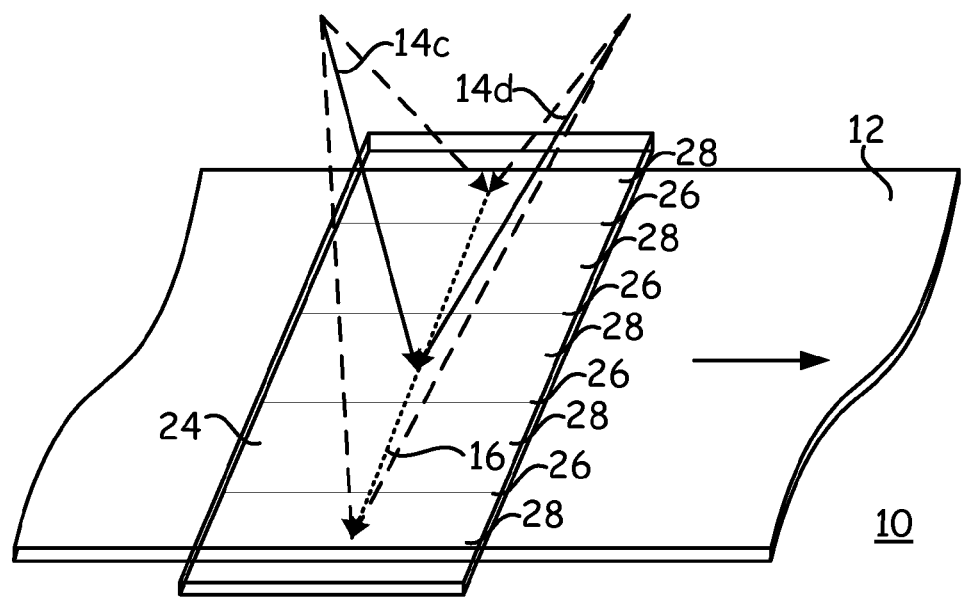
FIG. 4 is a third embodiment for illuminating a film, according to the present invention.
Figure 6:
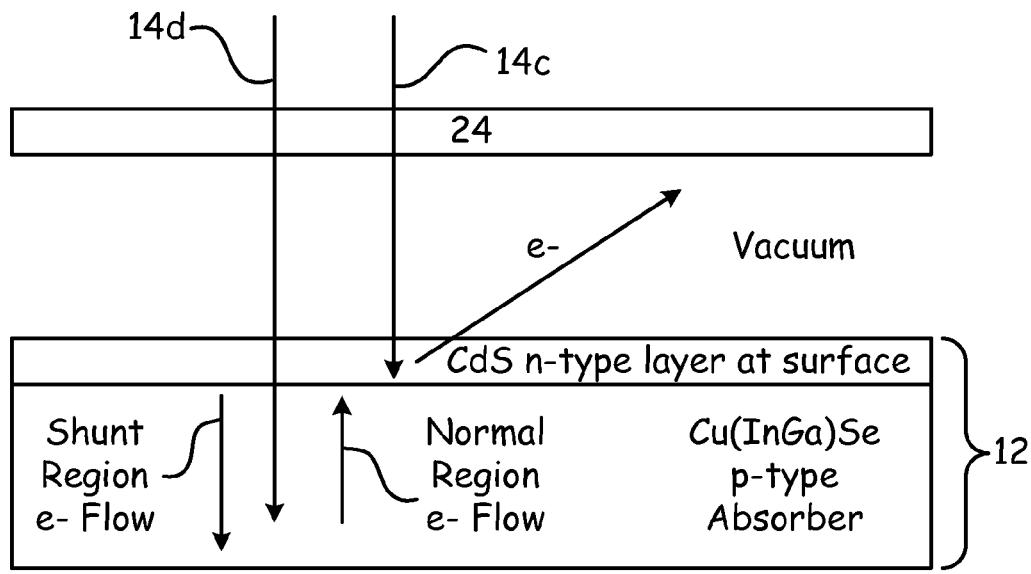
FIG. 6 depicts an embodiment for the flow of electrons through a second type of photovoltaic material in both the presence of a shunt and in normal operation of the photovoltaic material, when a probe and pump are applied to the material.

For the case of a Cu(In,Ga)Se solar cell 12, the inspection procedure is different because the Cu(In,Ga)Se solar cell 12 is grown in a substrate configuration beginning with the opaque back contact. In one embodiment of an inspection process for a Cu(In,Ga)Se solar cell 12, both the probe laser 14*c* and the pump laser 14*d* are directed to the CdS surface opposite the substrate, as depicted in FIG. 4. The CdS film 12 is typically a fifty to one hundred nanometer thick layer deposited on top of the active Cu(In,Ga)Se film, and serves to complete the junction for the solar cell 12. Substantially all of the photoelectrons ejected by the ultraviolet probe 14*c* are ejected from the CdS film 12. The band gap of CdS is 2.4 electron volts, which exceeds the 2.33 electron volt energy of the pump laser 14*d*. Hence, electrons are only significantly pumped in the Cu(In,Ga)Se material beneath the CdS film, and predominantly conduct vertically through the film 12 to the CdS surface before being excited by the ultraviolet probe 14*c*. FIG. 6 depicts both the flow of electrons in the presence of a shunt, and in normal operation of the film 12.

In general, the action of the solar cell 12 conducts electrons to the ultraviolet probe 14*c*, such that the photoelectron signal remains high. However, in the presence of a shunt the pumped electrons are conducted in the opposite direction, such that the photoelectron signal is small. Hence, a Cu(In,Ga)Se shunt is detected by a decrease in the signal—opposite that of the case for CdTe, where a shunt is detected by an increase in the signal.

As for the CdTe case, the inspection is predominantly sensitive to shunts beneath the probe laser 14*c*, due to the high resistivity of the CdS film 12. The inspection is preferably performed under vacuum, to allow the photoelectrons to reach the detector. For the cases described above, the pump laser may be replaced by any source of light, such as a broad spectrum lamp, that excites electrons between the valence and conduction bands but does not have the energy to excite electrons from the conduction band to the vacuum. This could be referred to as a lower energy light source, not necessarily in the visible range of the spectrum. The intensity of this light source may be adjusted to vary the open circuit voltage across the photovoltaic film 12, thereby allowing the inspection to selectively activate weak diodes that have different open circuit voltages. Likewise, the probe laser may be replaced by any light source, including a broad spectrum lamp, with an energy sufficient to excite electrons from the conduction band minimum to the vacuum. This could be referred to as a higher energy light source.

A vacuum of about one-tenth of a millitorr to about one millitorr is created in a chamber mounted to a frictionless air bearing that is passed over the film 12. Alternately, the film 12 is passed beneath a vacuum chamber mounted to a frictionless air bearing, such as in the case of a moving conducting web on which a Cu(In,Ga)Se film is deposited. Either the probe laser 14c or both the probe and pump lasers 14c and 14d are directed through an ultraviolet quality fused silica window 24 that is coated with a transparent conducting oxide film on the surface that faces the photovoltaic material 12. The separation between the window 24 and the photovoltaic film 12 is reduced to a small enough gap (such as less than about one millimeter) to allow ejected photoelectrons from the photovoltaic film 12 to reach the transparent conducting oxide film, and from there to be conducted to an ammeter (not depicted in FIG. 4).

The opposite terminal of the ammeter is electrically connected to the single conducting contact on the solar cell 12. For CdTe photovoltaics 12, the conductor is the transparent conducting oxide layer that is deposited on the glass substrate. For Cu(In,Ga)Se photovoltaics 12, the conductor is typically the steel substrate on which the Cu(In,Ga)Se is grown. Electrical contact with the substrate can be made in a variety of different ways, such as with a conducting brush in the case of a moving web of material 12.

In one embodiment of this invention, the transparent conducting oxide film coating the detector is scribed in the direction of the motion of the vacuum chamber or photovoltaic material to create separate detectors 28 that are read in parallel, as depicted in FIG. 4. The ultraviolet probe 14c and the visible pump 14d are then focused to a streak source across the window 24, normal to the scribe lines 26, so that data is collected simultaneously from all of the detectors 28.

Thus, use of surface contact methods that are not based on the photoelectric effect, such as by using a plasma or a brush or, in the case of electron beam induced current, the electron beam itself (as either a positive or negative contact, depending on the landing energy), can be used for direct, in-line inspection of the photovoltaic material using electron beam induced current or optical beam induced current to detect not only the areas of the shunts, but also regions of poor carrier collection due to a poorly formed p-n junction, high recombination, or low mobility. Results from this in-line inspection can be used for electrical isolation of the shunts, or feedback for control of the deposition processes or other process steps involved in the fabrication of the photovoltaic device.

If sufficient signal to noise levels are available, two streak sources and detectors can be deployed at, for example, nominal angles of positive forty-five degrees and negative forty-five degrees with respect to the axis normal to the direction of the moving photovoltaic material 12. The position of the defect is then determined by the time of arrival of the signal at each source. Such a configuration can also be used with optical sources and segmented detectors to locate other defects besides electrical shunts. These defects include, for example, regions of poor carrier collection due to a poorly formed p-n junction, high recombination, or low mobility due to deviations from ideal stoichiometry or defects in the crystal structure or the size of the crystalline regions, or the presence of contaminants. In addition, the bare substrate can be inspected for scratches or surface contamination (such as organic stains).

Yet another embodiment uses an electron source such as a scanning electron microscope column or nanotube emitter to complete the circuit. In one embodiment the electron source is rastered across the film in a direction normal to the direction of the moving material 12. The signal is the electron beam induced current that is collected from the contact on the opposite side of the film 12. The landing energy is preferably varied to deposit predominantly positive or negative charge, thereby utilizing the electron beam to make electrical contact with the top surface of the photovoltaic device 12.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of inline inspection of photovoltaic material for electrical anomalies without removing samples from the material, the method comprising the steps of:

forming a first electrical connection to a top side of the photovoltaic material using a non-physical contact to the photovoltaic material with at least one of a light source and an electron beam, wherein a vacuum for the first electrical connection is formed by mounting a vacuum chamber to a frictionless air bearing that creates a seal between the vacuum chamber and the top side of the photovoltaic material and allows the photovoltaic material to pass freely beneath the first electrical connection, forming a second electrical connection to a bottom side of the photovoltaic material using a physical contact to the photovoltaic material, inducing a localized current in the photovoltaic material, sensing properties of the localized current in the photovoltaic material using the first and second electrical connections, and analyzing the properties of the sensed localized current to detect the electrical anomalies in the photovoltaic material.

* * * * *